May 9, 1950  E. N. JACOBI  2,506,642
MOUNTING MEANS FOR IGNITION SWITCH LOCKS
Filed April 29, 1946  3 Sheets-Sheet 1
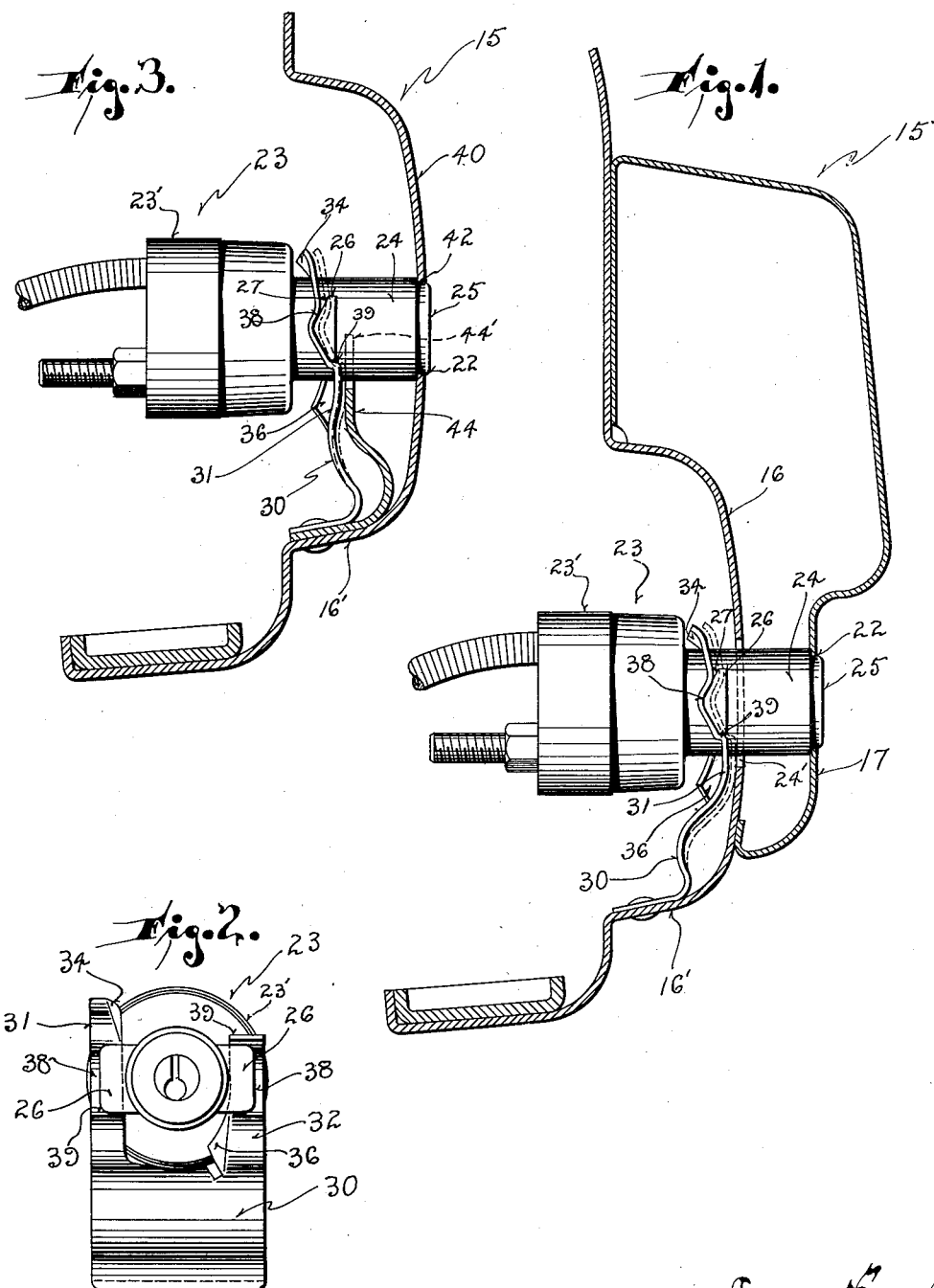

May 9, 1950 E. N. JACOBI 2,506,642
MOUNTING MEANS FOR IGNITION SWITCH LOCKS
Filed April 29, 1946 3 Sheets-Sheet 2
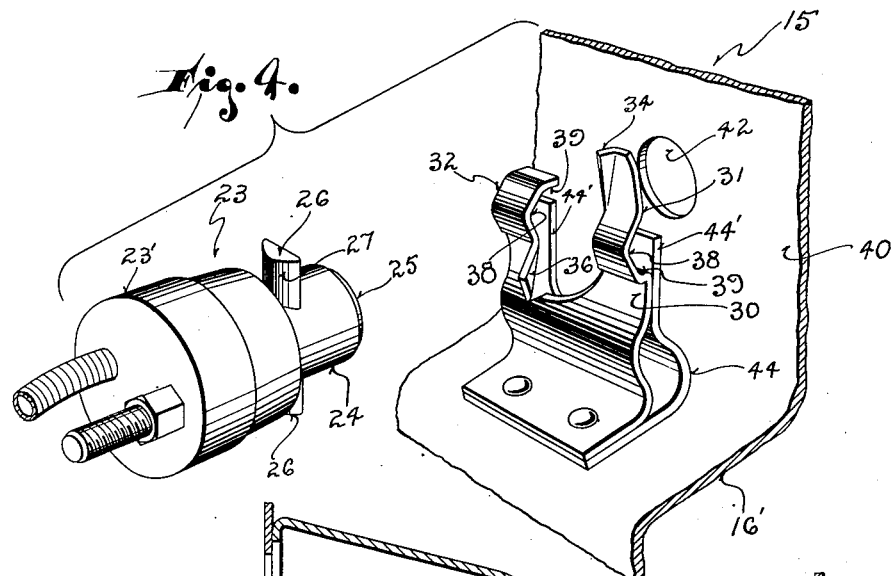
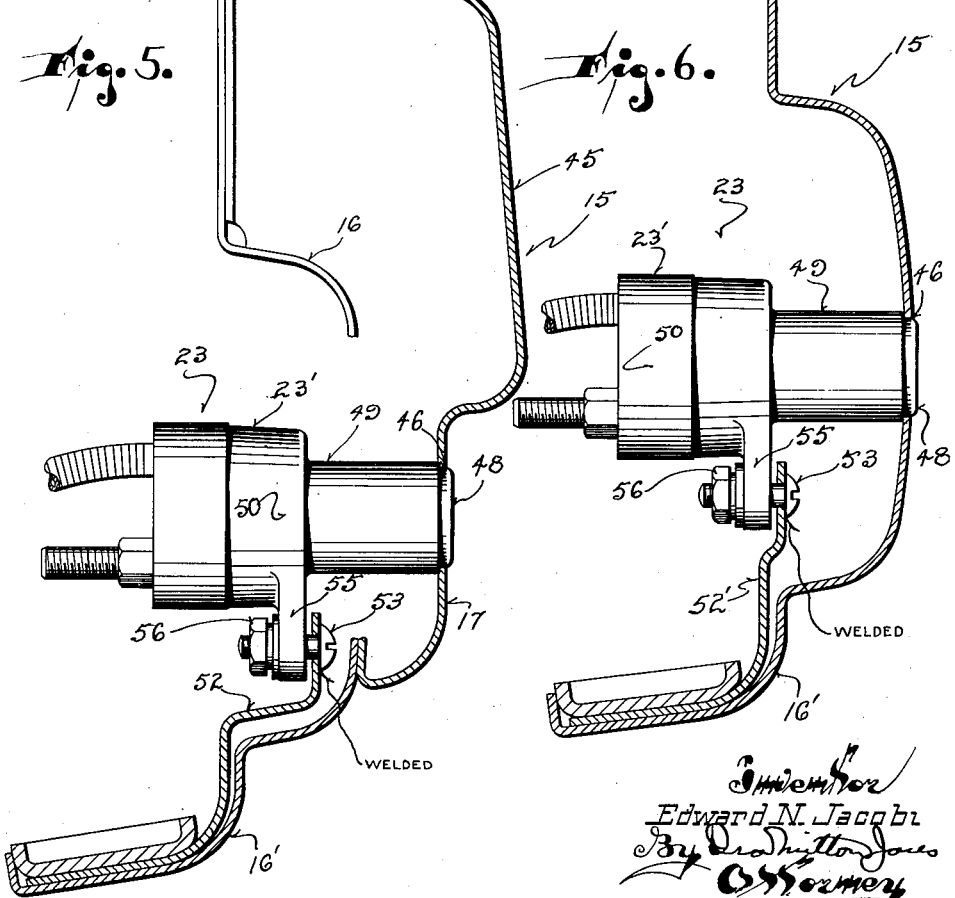
Inventor
Edward N. Jacobi

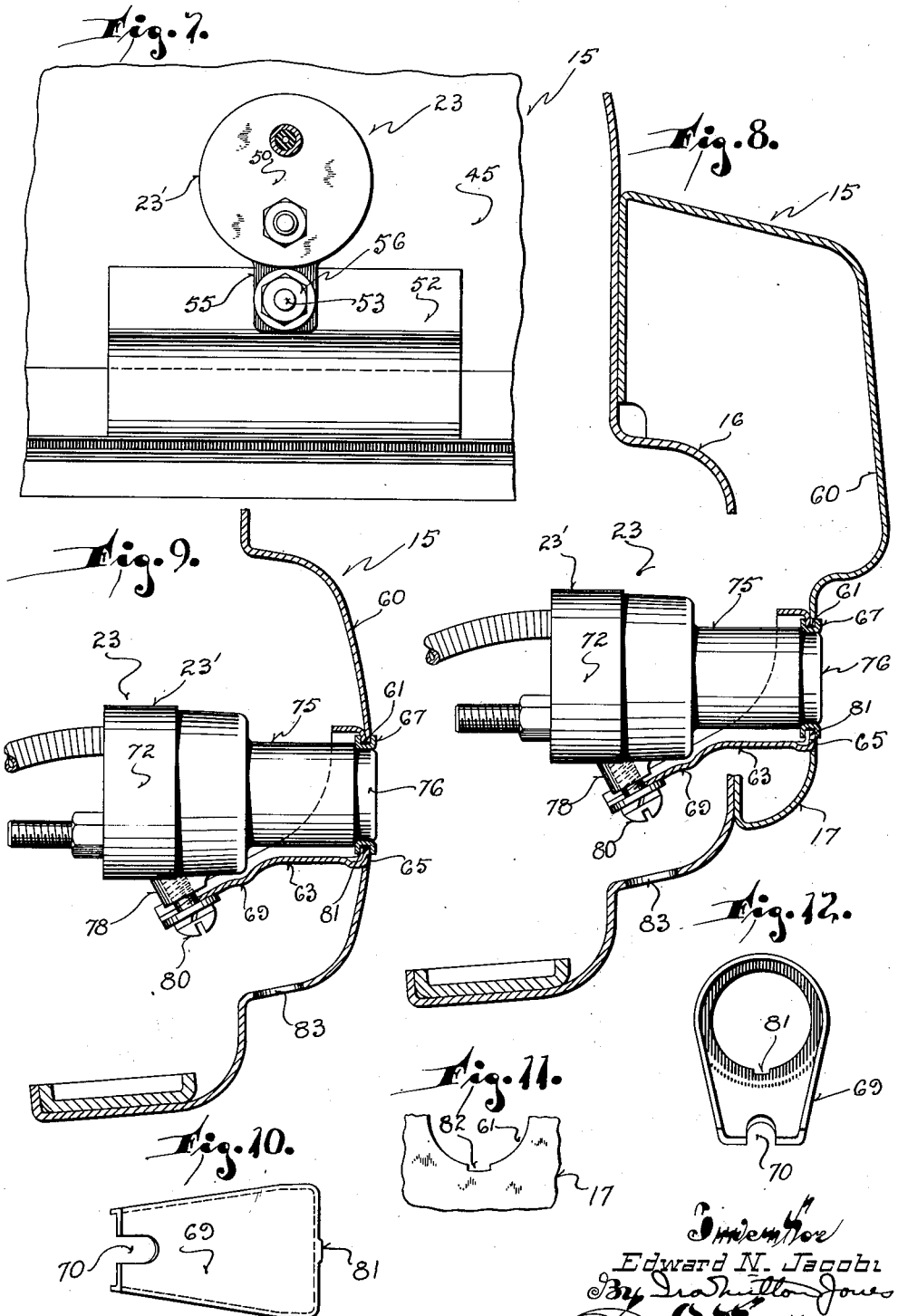

Patented May 9, 1950

2,506,642

UNITED STATES PATENT OFFICE 2,506,642

MOUNTING MEANS FOR IGNITION SWITCH LOCKS

Edward N. Jacobi, Milwaukee, Wis., assignor to Briggs & Stratton Corporation, Milwaukee, Wis., a corporation of Delaware Application April 29, 1946, Serial No. 665,879

8 Claims. (Cl. 180—90)

This invention relates to the automotive art and refers more particularly to improved mounting means for securing the ignition switch locks of automotive vehicles in place on the instrument panel of the vehicles.

In the past, ignition switch locks were commonly secured in place on the instrument panel of automobiles by means of a clamping cup or bracket located behind the instrument panel and secured to the panel by spot welding. The spot welding process, however, leaves unsightly blemishes on the exterior of the panel and to preserve neatness of appearance it was heretofore necessary to grind and polish the exterior of the panels at their spot welded areas to remove objectionable roughness.

Hence, it is an object of the present invention to provide improved means for mounting ignition switch locks of the character described on instrument panels or the like the use of which eliminates the previously required grinding and polishing operations on the instrument panel.

Another object is to provide an improved mounting means for ignition switch locks which acts to effectively prevent rattling of the lock structure thus reducing noise.

A further object is to provide mounting means for ignition switch locks of exceedingly simple design so as to reduce manufacturing costs.

A still further object is to provide improved mounting means for ignition switch locks which greatly simplifies securing the lock structure to the instrument panel.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiment of the invention constructed according to the best modes so far devised for the practical application of the principles thereof, and in which:

Figure 1 is a cross sectional view through the instrument panel of an automobile showing one form of mounting means for holding the ignition switch lock in place on the panel;

Figure 2 is a front view of the mounting means shown in Figure 1, to further illustrate its relationship to the ignition switch lock;

Figure 3 is a view similar to Figure 1 but showing a slightly modified form of instrument panel;

Figure 4 is a perspective view of the mounting means shown in Figure 3 with the ignition switch lock about to be applied thereto;

Figure 5 is a cross section of the instrument panel shown in Figure 1 showing a modified form of mounting means;

Figure 6 is a cross sectional view through the instrument panel shown in Figure 3 but with the same type of mounting means as shown in Figure 5;

Figure 7 is a rear view of the ignition switch lock and mounting means shown in Figures 5 and 6;

Figure 8 is a cross section through an instrument panel similar to Figure 1 showing a second modified form of mounting means;

Figure 9 is a cross section through an instrument panel similar to Figure 3 showing the modification of the invention disclosed in Figure 8;

Figure 10 is a bottom view of the mounting means shown in Figures 8 and 9;

Figure 11 is a view of the opening through the instrument panel shown in Figures 8 and 9; and Figure 12 is a view of the mounting means shown in Figures 8 and 9 looking from the left with the ignition switch lock removed.

Referring now more particularly to the accompanying drawings in which like numerals indicate like parts, the numeral 15 generally designates the instrument panel of an automobile.

The instrument panel shown in Figure 1 is of the type employed on a super-deluxe model automobile, and is characterized by the provision of spaced apart inner and outer substantially upright wall sections 16 and 17 respectively, with the outer wall section 17 exposed to the driver's compartment and providing in effect a false front for the instrument panel.

Various instruments are adapted to be mounted behind the instrument panel with portions thereof exposed at the front of the panel in the customary manner. One of these instruments is shown, by way of example, as comprising an ignition switch lock generally designated 23 and it is the purpose of this invention to provide simple and inexpensive means for mounting the lock structure on the instrument panel.

The switch lock illustrated includes an enlarged body 23' adapted to be positioned at the rear of the innermost panel 16, and a substantially cylindrical barrel 24 projecting from the body through an aperture 24' in the panel 16 and having a reduced portion 25 at its forward extremity adapted to project through a suitable aperture 22 in the front panel 17 so as to be accessible from the front of the instrument board.

In its assembled position the shoulder formed at the juncture between the reduced portion 25 and the forward end of the barrel is adapted to abut against the rear surface of the front panel section 17 with the reduced extremity 25 thereof projected through the aperture 22.

The barrel 24 is also shown provided with a pair of diametrically opposite lugs 26 projecting radially outwardly from the sides thereof. These lugs have a substantially triangular cross section with one side of the lugs lying in a plane substantially normal to the axis of the barrel and parallel to the panel section 17 and the remaining two sides of the triangle converging toward the body 23' and defining an obtuse angle at their juncture.

The rear sides of the lugs thus provide cam surfaces 27 for engagement with the mounting means 30 of this invention in a manner now about to be described.

In the embodiment of the invention illustrated in Figure 1 the mounting means 30 is shown in the form of a spring clip anchored at its lower extremity to the flange-like undersurface 16' of the inner panel 16 as by riveting or spot welding. The free portion of the clip extends upwardly along the rear of the panel 16 toward the switch structure 23 and is bifurcated to provide a pair of similar spring fingers 31 and 32.

It will be noted that the rivets which are shown securing the spring clip or retainer 30 to the flange 16' of the instrument panel pass through a portion of the panel ordinarily hidden from the view of passengers in the vehicle and hence do not detract from the finished appearance of the instrument panel.

The fingers 31 and 32 are so located with respect to the aligned apertures 22 and 24' as to require endwise insertion of the barrel 24 of the switch structure therebetween during assembly with the lugs 26 on the barrel held in a vertical position substantially parallel to the length of the spring fingers. In this position of the lugs, the reduced extremity 25 is projected through the aperture 22 to bring the shoulder at the forward extremity of the barrel against the back of the panel section 17, at which time the cam surfaces 27 on the lugs 26 substantially align radially with cam surfaces 34 and 36 on the spring fingers 31 and 32 respectively.

The cam surface 34 is formed by a rearwardly bent portion on the inner side edge of an upward extension on the spring finger 31 to be located above the barrel of the switch structure while the cam surface 36 is formed by a rearwardly bent portion on the inner side edge of the finger 32 beneath the barrel of the switch structure. These cam surfaces 34 and 36 are substantially simultaneously engaged by the cam surfaces on the backs of the lugs 26 upon rotation of the barrel 24 in a counterclockwise direction as seen in Figure 2.

Rotation of the switch structure 23 in said counterclockwise direction with the lugs 26 held in a vertical position therefore results in camming both of the spring arms 31 and 32 rearwardly away from the panel section 16 against which the same are biased, with rotation of the lugs through an angle of approximately 90° aligning their back sides with transversely aligning indentations or seats 38 formed in the sides of the spring fingers facing the back of the panel. Upon such alignment, the fingers snap forwardly with a detent action to securely hold the switch structure in an assembled position with the forward end of the barrel pressed against the rear of the panel 17 under spring tension.

Shoulders 39 at the bottom of the seat in the finger 31 and at the top of the seat in the finger 32 engage with the side edges of the lugs 26 to limit rotation with the barrel beyond the indentations or seats and thus insure proper detent action of the spring clip. The spring clip naturally has sufficient stiffness or force as to hold the switch structure firmly in place and against accidental rotation after engagement of the lugs in their respective indentations or seats in the spring fingers.

Attention is also directed to the fact that the motion of the spring fingers toward the back of the panel section 16 in response to the bias thereon is limited by engagement of portions of the spring fingers beneath the recesses 38 therewith the back of the panel section 16. Prior to assembly of the lock switch therefore it will be seen that both fingers are held in positions at which the cam surfaces 34 and 36 thereof align with the cam surfaces formed on the backs of the radial lugs 26 on the barrel of the switch structure.

In the form of the invention shown in Figures 3 and 4, the instrument panel 15 is provided entirely by a single wall section 40 similar in all respects to the inner panel sections 16 of the Figure 1 embodiment. This instrument panel 40 may be of the type with which standard or deluxe model automobiles are provided.

The instrument panel 40 has an aperture 42 to receive the reduced forward extremity 25 of the switch 23 which is similar in all respects to the switch structure shown in Figures 1 and 2 and hence has been designated with the same numerals. The spring clip 30 is likewise identical to that shown in Figures 1 and 2 and hence has identical numerals identifying the parts.

In the absence of the inner panel 16 such as is provided in the Figure 1 embodiment, it is necessary to employ a separate stop to properly position the spring clip 30 and insure engagement of the lugs 26 ahead of the arms 31 and 32. A rigid bifurcated stop member 44 is, accordingly, secured together with the spring clip 30 to the instrument panel on the flange-like underside 16' thereof by rivets or any other equivalent fastening means which are not visible to the driver or passengers in the car. Hence, special surface grinding or refinishing at the areas at which the securing means is located is avoided.

The rigid stop member 44 has arms 44', one on each side of the barrel 24 and against which the portions of the spring fingers 31 and 32 beneath the seats thereof abut to limit motion of the arms toward the panel 40 in response to the bias thereon so that the arms are held in position to have the lugs 26 engage forwardly thereof during assembly of the switch on the panel.

In the operation of the devices shown in Figures 1 to 4, inclusive, the barrel of the switch structure is inserted endwise between the fingers 31 and 32 of the spring clip 30 with the lugs 26 vertical as seen in Figure 4, and the projection 25 inserted either in the hole 22 or 42 to bring the forward extremity of the barrel against the panels 17 or 40. The ignition lock switch 23 may then be rotated counterclockwise as seen in Figure 2, or clockwise as seen in Figure 4, so that the cam lugs 26 engage with the cam surfaces 34 and 36 on the arms and move the same outwardly, permitting the lugs to seat in the recesses or indents 38 of the fingers 31 and 32, thus securely clamping the switch structure in position on the instrument panel under substantial spring pressure and preventing rotation or rattling of the switch thereon.

Referring to the embodiment of the invention shown in Figure 5, it will be seen that the instrument panel designated 15 has a false front section 45 like that of the Figure 1 embodiment, provided with an aperture 46 therein to receive the reduced portion 48 on the forward extremity of a lock barrel 49 forming part of an ignition switch lock 50.

A spring clip 52 is herein provided to hold the switch in place on the panel, and is shown secured to the flange-like lower part of the instrument panel by welding, riveting or other well known means in the manner hereinbefore described; the connection again being made in a portion of the panel that is not ordinarily seen by passengers in the car so that the outer surface will not require grinding after the spring clip 52 is secured in place.

The spring clip 52 has an aperture therethrough in its upper end to receive a screw 53 which is preferably permanently secured to the clip by welding. The screw is received in a hole (not shown) in a lug 55 formed on the lower side of the lock housing 50, and a nut 56 threaded on the screw to react against the lug draws the forward end of the barrel of the lock switch up against the back of the instrument panel 45 with the projection 48 extending through the panel to be accessible at the front thereof.

Since tightening of the nut 56 on the screw 53 flexes the clip away from the panel, the resulting tension on the clip is employed to press the barrel of the switch 50 firmly against the back of the panel to prevent rattling of the assembly.

The clip 52' shown in Figure 6 is substantially the same as that of Figure 5, but the false front wall section 45 has been eliminated to illustrate application of the mounting means to a standard type instrument panel.

In operation of the forms of the invention shown in Figures 5, 6 and 7, the switch structure 50 is inserted from behind the panel with the projection 48 extending through the aperture 46 therein and the aperture in the lug 55 engaged over the screw 53. The nut 56 may then be threaded onto the projecting end of the bolt 53 and tightened to place the spring clip 52 under tension to draw the switch 50 securely against the panel 45.

In the form of the invention shown in Figures 8 to 12, inclusive, the instrument panel is like that of Figure 1 and has a false front section 60 provided with an aperture 61. The mounting bracket 63 for the switch has an inturned collar or flange 65 with an inside diameter equal to the diameter of the aperture 61 so that the bracket 63 may be secured on the back side of the panel by means of a bright eyelet stamping 67 common to the panel and bracket.

The bracket 63 has a substantially stiff spring arm 69 which is joined to the collar 65 and extending at a rearward and downward inclination away from the panel 60, with a slot 70 cut in the outer free extremity of the arm. The housing 72 has a forwardly extending lock barrel 75 terminating in a reduced end portion 76 which is received substantially snugly in the eyelet 67 to be exposed at the front of the panel 60.

The switch body 72 also has a lug 78 formed on its under side facing the inclined spring arm 69. This lug 72 has a tapped hole sloped at an acute angle to the axis of the switch and substantially perpendicular to the flat portion of the arm 69. The lug and its tapped hole align with the slot 70 in the free extremity of the arm so that a screw 80 projecting through the slot may be threaded into the lug 78 to hold the switch structure 72 assembled on the panel 60.

A key 81 on the flange 65 punched forwardly out of the plane of the flange and into the plane of the panel 60 is received in a keyslot 82 opening to the aperture 61 to lock the bracket 63 against rotation on the back of the panel.

In operation the screw is started in the aperture in the lug 78 prior to insertion of the reduced portion 76 of the lock switch into the eyelet 67 so that upon such positioning of the switch structure the shank of the screw slides into place in the slot 70 with the head of the screw beneath the bracket arm.

A screw driver may then be inserted through an aperture 83 in the flange-like bottom of the panel 60 and the screw 80 tightened in the lug so as to draw the forward end of the barrel firmly against the back of the panel 60 and to effect a degree of downward tilting of the switch structure which causes the reduced end portion 76 of the barrel to become substantially wedged or skewed in its eyelet to prevent rattling of the parts. The inherent resiliency of the arm 69 serves to maintain the switch structure tilted in this manner under a degree of spring pressure.

From the foregoing description taken in connection with the accompanying drawings, it will be readily apparent to those skilled in the art that this invention provides simple and inexpensive but highly efficient means for mounting lock switches on the rear of automobile instrument panels, and which insure against rattling of the switch structure.

What I claim as my invention is:

1. Means for mounting an instrument on the back of an instrument panel of the type having an aperture in an upright portion of the panel to receive a reduced end portion at the forward extremity of the instrument to locate the same and to expose the reduced extremity of the instrument to view at the front of the panel, comprising: a support anchored at one end to the panel at the rear thereof and having a resilient portion extending therefrom toward the instrument; a radial abutment on the instrument adapted to be engaged in front of said resilient portion so that the instrument will be held firmly pressed against the rear of the panel under a degree of spring pressure sufficient to preclude vibration of the instrument relative to the panel and with the reduced extremity thereof located in said aperture of the panel.

2. Means for mounting an instrument in position on the back of an instrument panel of the type provided with a rearwardly directed flange along its lower edge and having an aperture in an upright portion of the panel to receive a reduced end portion at the forward extremity of the instrument to locate the same and to expose the reduced extremity of the instrument to view at the front of the panel, comprising: a spring clip having a portion anchored to said flange at the rear of the instrument panel; a pair of resilient arms projecting upwardly from said attaching portion in spaced relation to said upright portion of the instrument panel, said arms being spaced from each other laterally a distance to receive the instrument therebetween and being biased toward the back of the panel; and means on said arms engaging parts at opposite sides of the instrument having its reduced extremity in said aperture with a detent action upon rotation of the instrument on an axis normal to the plane of the panel through an arc of predetermined magnitude to hold the instrument against accidental movement relative to the panel, said arms exerting a spring force on the instrument to firmly press the same against the back of the panel and thereby maintain the reduced end portion of the instrument located in said aperture and exposed at the front of the panel.

3. Mounting means as set forth in claim 2 further characterized by the provision of cam surfaces on said resilient arms engaged by said parts on the instrument during rotation of the instrument to facilitate engagement of said parts on the instrument with the detent means on the arms.

4. Mounting means as set forth in claim 2 wherein said detent means on the resilient arms are provided by indentations in the arms at the sides thereof facing the back of the panel.

5. Means for mounting an instrument on the back of an instrument panel of the type having an aperture in an upright portion of the panel to receive a reduced end portion at the forward extremity of the instrument to locate the same and to expose the reduced extremity of the instrument to view at the front of the panel, comprising: a spring retainer including an attaching portion anchored to the instrument panel at the rear thereof, and a pair of resilient arms projecting from said attaching portion to overlie the back of the panel in spaced relation thereto, said arms being spaced from each other a distance to receive the instrument therebetween and being biased by their resiliency toward the back of the panel; cam surfaces on the inner side edges of the arms extending at a rearward angle away from the panel and engaged by parts at opposite sides of the instrument having its reduced extremity in said aperture upon rotation of the instrument in one direction on an axis normal to the upright portion of the panel to flex the arms rearwardly away from the panel against the resiliency of the arms thereby enabling positioning of said instrument parts ahead of the arms; means fixed with respect to the panel and against which the arms engage prior to such rotation of the instrument between the arms for holding the arms in predetermined spaced relationship with respect to the panel to insure engagement of their cam surfaces by said parts on the instrument; and detent means on the arms engaged by said parts on the instrument upon rotation of the instrument in the aforesaid manner through an arc of predetermined magnitude for defining the final assembled position of the instrument on the panel, said detent means being rendered effective with the arms under tension so that the arms act to firmly press the instrument against the back of the panel.

6. Means for mounting an instrument in position on the back of an instrument panel of the type provided with a rearwardly directed flange along its lower edge and having an aperture in an upright portion of the panel to receive a reduced end portion at the forward extremity of the instrument to locate the same and to expose the reduced extremity of the instrument to view at the front of the panel, comprising: a spring support including an attaching portion anchored to said flange on the instrument panel at the rear thereof, and a resilient arm extending upwardly from said attaching portion toward the side of the instrument having its forward extremity received in said aperture in the panel; and means on the extremity of the arm remote from its attaching portion providing for connection of the arm to the instrument at one side of the instrument in a manner causing flexure of the arm against the resiliency thereof away from the back of the instrument panel so that the arm is placed under tension and reacts on the instrument in a direction to firmly press the same against the back of the instrument panel and maintain the reduced extremity of the instrument located in said aperture of the panel.

7. Means for mounting an instrument on the back of an instrument panel of the type provided with a rearwardly directed flange along its lower edge and having an aperture in an upright portion of the panel to receive a reduced end portion at the forward extremity of the instrument to locate the same and to expose the reduced extremity of the instrument to view at the front of the panel, comprising: an anchoring part attached to the rearwardly extended flange of the panel; spring means reacting between said anchoring part and an abutment on the instrument; and means on said spring means cooperable with said abutment to provide a bayonet connection whereby the abutment may be inserted under the spring so that the spring will be tensioned and will thus press the instrument against the back of the panel and hold the same in position with its reduced end portion received in the aperture in the panel, said spring means having a force sufficient to preclude vibration of the instrument relative to the panel.

8. Means for mounting an instrument on the back of an instrument panel of the type having an aperture adapted to receive a reduced end portion at the forward extremity of the instrument to locate the same and to expose the reduced extremity of the instrument to view at the front of the panel, said means comprising: a bifurcated spring clip anchored at the rear of said instrument panel and having its legs projecting substantially parallel to the portion of the panel surrounding said aperture and biased toward the panel, said legs being spaced apart a distance to receive the instrument between them; and detent portions on said legs adapted to overlie radial lugs projecting from opposite sides of the instrument to thereby bias the reduced end portion of the instrument into firm engagement with the panel and to preclude rotation of the instrument.

EDWARD N. JACOBI.

REFERENCES CITED

The following references are of record in the file of this patent:

UNITED STATES PATENTS

| Number | Name | Date |
| --- | --- | --- |
| 945,049 | Russell | Jan. 4, 1910 |
| 1,537,612 | Jack | May 12, 1925 |
| 1,692,449 | Keeney | Nov. 20, 1928 |
| 2,151,113 | Jacobi | Mar. 21, 1939 |
| 2,183,372 | Thoma | Dec. 12, 1939 |